United States Patent [19]

Tominaga

[11] Patent Number: 4,579,045
[45] Date of Patent: Apr. 1, 1986

[54] BELLOWS
[75] Inventor: Hiroshi Tominaga, Kanagawa, Japan
[73] Assignee: Fuji Electric Company, Ltd., Kawasaki, Japan
[21] Appl. No.: 643,182
[22] Filed: Aug. 22, 1984
[30] Foreign Application Priority Data
  Aug. 23, 1983 [JP] Japan .............. 58-129890[U]
[51] Int. Cl.$^4$ .............................. F16J 3/04
[52] U.S. Cl. ............................ 92/42; 92/45
[58] Field of Search ............ 92/45, 42, 177, 34
[56] References Cited
  U.S. PATENT DOCUMENTS
  367,744  8/1887 Davis ........................ 92/42
  2,811,835 11/1957 Rike ......................... 92/42
  3,707,937  1/1973 Liles ........................ 92/42

FOREIGN PATENT DOCUMENTS
  80557  7/1981 Japan ........................ 92/42

Primary Examiner—Robert E. Garrett
Assistant Examiner—Mark A. Williamson
Attorney, Agent, or Firm—Finnegan, Henderson, Farabow, Garrett & Dunner

[57] ABSTRACT

A bellows including a reenforcement member having an edge attached to each side of the bellows body to eliminate distortion and damage upon the application of lateral forces. The reenforcement member has a central opening so as not to obstruct the movement of air within the bellows.

10 Claims, 7 Drawing Figures

BELLOWS

FIELD OF THE INVENTION

The present invention relates to an accordion type bellows, including an flexible member which is formed by bending a sheet of flexible material in zig-zag fashion.

BACKGROUND OF THE INVENTION

A typical example of a conventional accordion type bellows is shown in FIGS. 1 and 2.

FIG. 1 is an enlarged drawing of a part of the bellows shown in FIG. 2. The conventional bellows, as shown in FIG. 3, includes flexible members 3, each of which is formed so as to be flexible by bending a sheet member such as a cloth or a plastic sheet in a zig-zag fashion. Both ends of the cloth or sheet are fixed to opposing mounting plates 2 and reinforcement wires 4 are provided with the sheet member wound around them.

In the conventional bellows 1, when an external force is applied to the flexible member 3 from a direction as shown by the arrow A, the reinforcement wires 4 are bent backward and the flexible member 3 is irregularly bent. In order to overcome that drawback of the conventional bellows in FIG. 3, there has been proposed a bellows having plastic plates 5 attached to planar portions of the flexible member 3, as shown in FIG. 4. The plastic plates 5, however, cause the thickness of the bellows to be greatly increased when it is collapsed.

OBJECTS AND SUMMARY OF THE INVENTION

An object of the present invention is to provide an improved bellows which is not easily deformed by an external force applied thereto.

Another object of the present invention is a bellows which has a small thickness when collapsed.

A further object of the present invention is a bellows which is capable of long-lasting use.

These and other objects of the present invention are accomplished by a bellows comprising a pleated bellows body collapsible and extendable along a predetermined bellows axis and including an interior, an exterior, and a plurality of sides, and a reinforcement member attached to the bellows body, the reinforcement member having a plurality of edges attached to the interior of corresponding sides of the bellows body at the location of a pleat thereof.

DETAILED DESCRIPTION OF THE PREFERRED EMBODIMENTS

Figure 1:
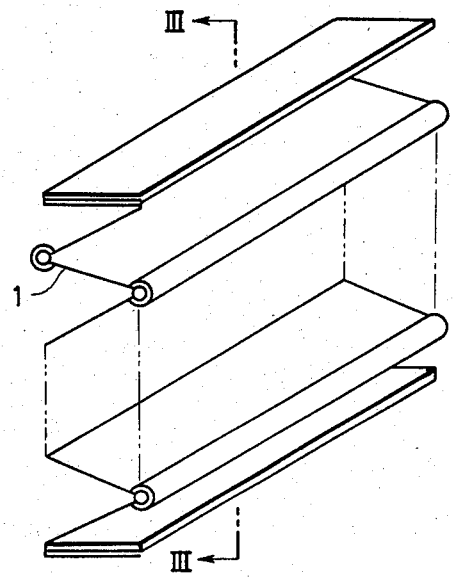
FIG. 1 is a perspective view showing the sidewall of a conventional bellows.
Figure 2:
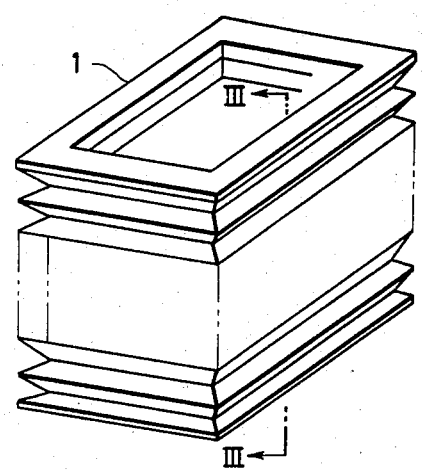
FIG. 2 is another perspective view of a conventional bellows.
Figure 3:
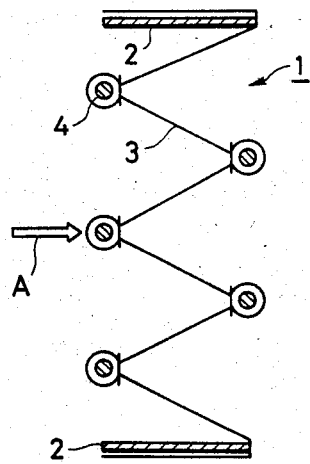
FIG. 3 is a cross-sectional view of FIGS. 1 and 2 taken along the line III—III in each and showing one sidewall of the conventional bellows.
Figure 4:
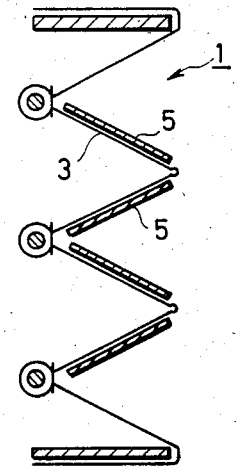
FIG. 4 is a cross-sectional view of another embodiment of a conventional bellows.
Figure 5:
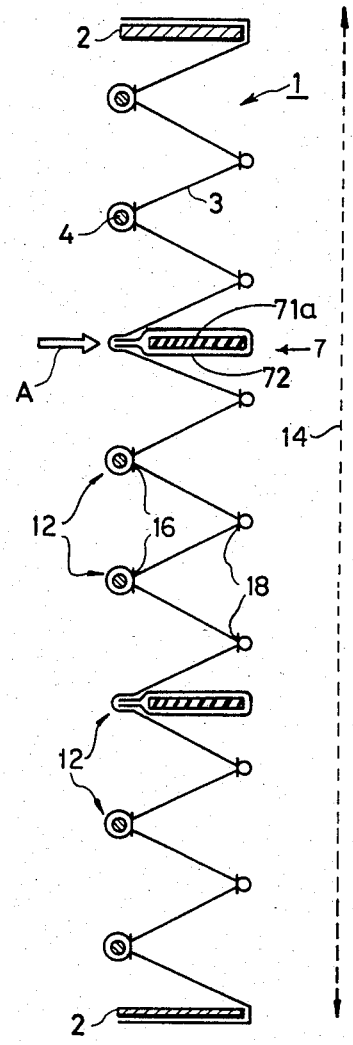
FIG. 5 is a cross-sectional view of the sidewall of one embodiment of the bellows of the present invention.
Figure 6:
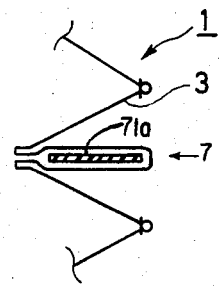
FIG. 6 is a cross-sectional view of the sidewall of another embodiment of the present invention.
Figure 7:
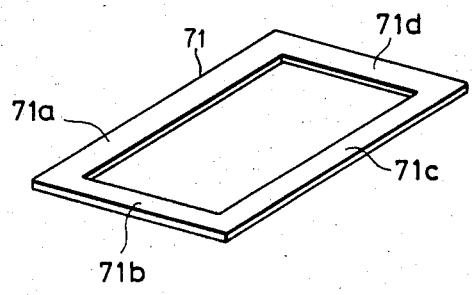
FIG. 7 is a perspective view of a frame element used in the embodiments of FIGS. 5 and 6.

FIGS. 5 and 6 show embodiments of the present invention, wherein like reference numerals designate like components in FIGS. 1 to 4.

FIG. 5 shows a side view of one sidewall, also termed a "side" or "side member", of one embodiment of the bellows of the present invention, wherein both ends of a flexible member 3, e.g., a cloth sheet, are attached to opposing mounting plates 2. Flexible member 3 is formed into a series of pleats 12 series-connected along bellows axis 14 and having outwardly (with respect to bellows axis 14) converging creases 16 and inwardly converging creases 18. Reinforcement plates 7 are provided in the sidewalls of the bellows. The reinforcement plates 7 are constructed in a window frame fashion and each is formed by a rectangular frame 71 of thin steel plate with sides 71a–71d. Each side 71a–71d has a holding cloth 72 wound around it.

One side or edge of the holding cloth 72 wound around the side 71a of the rectangular frame 71 is stitched together with the bent portion, i.e., a crease, of the flexible member 3. The holding cloths 72 covering the other three sides 71b–71d of the reinforcement plate 7 are also stitched to bent portions or creases of the other three flexible members of the sidewalls of the bellows. A plurality of the reinforcement plates 7 are fixedly mounted to the flexible members 3 at intervals along the expansion and contraction axis of the bellows, namely along bellows axis 14. In the embodiment shown in FIG. 5, two reinforcement plates 7 are provided along the lengths of the flexible member 3 such that they divide the longitudinal length of the flexible member into three equal parts.

In a bellows constructed in this manner, even if an external force is applied in the direction shown by the arrow A in FIG. 5, the external force is absorbed by the rigid reinforcement plates 7 to prevent the deformation of the flexible member 3. Further, the thickness of the fully collapsed bellows along the expansion/contraction axis thereof is not as large as the one shown in FIG. 3 because only a small number of reinforcement plates 7 need be mounted to the flexible members 3 in order to provide adequate reinforcement.

FIG. 6 is a sideview showing a part of an elastic member used in another embodiment of the present invention which differs from the embodiment of FIG. 5 in that the reinforcement plate 7 is formed by winding the side 71a of the rectangular frame 71 not by a holding cloth but by the cloth sheet constituting the flexible members 3. The function and advantages of this embodiment are substantially the same as the embodiment of FIG. 5.

While the salient features of the present invention have been described with reference to the drawings, it should be understood that the preferred embodiments described herein are susceptible of modifications and alterations without departing from the spirit and scope of the following claims.

What is claimed is:

1. A bellows comprising:

A plurality of side members attached together to form a bellows body collapsible and extendable along a predetermined bellows axis and having an interior and an exterior;

at least one planar reinforcement member having a number of sides equal to the number of said side members, each of said sides of said reinforcement member being disposed adjacent a different one of said side members; and a plurality of sheath members each substantially enclosing a respective one of said reinforcement member sides and being attached to the respective adjacent bellows side member continuously along the length thereof.

2. The bellows according to claim 1 wherein each of said side members includes a plurality of pleats connected in series along said predetermined axis and having at least one crease and wherein said sheath member enclosing the respective adjacent side of said reinforcement member is attached to said side member at said crease.

3. The bellows according to claim 2 wherein said reinforcement member is disposed in said interior of said bellows body.

4. The bellows according to claim 1 wherein each of said side members is made of flexible material and is wrapped around a corresponding adjacent side of said reinforcement member to form the respective sheath member.

5. The bellows according to claim 1 wherein each of said sheath members includes a cloth member wrapped around said side of said reinforcement member and attached to said adjacent respective side member.

6. A bellows according to claim 5 further including:
a first end plate attached to a first end of each of said side members; and
a second end plate attached to a second end of each of said side members.

7. The bellows according to claim 5 wherein said reinforcement member comprises a continuous sheet of rigid material provided with a plurality of substantially linear edges and a central opening.

8. The bellows as in claim 1 wherein each of said side members includes pleats with a number of outwardly-converging creases with respect to said bellows axis, the bellows further having a plurality of said reinforcement members less than the number of outwardly-converging creases whereby the bellows has a diminished thickness measured along the predetermined axis when collapsed.

9. The bellows as in claim 8 wherein a total of two of said reinforcement members are provided dividing the bellows into approximately $\frac{1}{3}:\frac{1}{3}:\frac{1}{3}$ segments along the predetermined axis.

10. A bellows comprising:
a pleated and creased bellows body collapsible and extendible along a predetermined axis and including an interior, an exterior, and a plurality of substantially linear sides;
an integral planar reinforcement member having a centrally located aperture and a plurality of substantially linear edges disposed adjacent to the interiors of corresponding sides of said bellows body at the location of one pleat thereof; and
a plurality of sheath members passing through said centrally located aperture for capturing said reinforcement member, said sheath members being attached to said bellows body sides at a crease immediately adjacent said one pleat.

* * * * *